(12) United States Patent
Ichinose

(10) Patent No.: US 7,059,654 B2
(45) Date of Patent: Jun. 13, 2006

(54) DOOR SYSTEM

(75) Inventor: Mikio Ichinose, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/820,807

(22) Filed: Apr. 9, 2004

(65) Prior Publication Data

US 2004/0201245 A1    Oct. 14, 2004

(30) Foreign Application Priority Data

Apr. 11, 2003    (JP) .............................. 2003-108348

(51) Int. Cl.
*B60J 1/08*    (2006.01)
(52) U.S. Cl. .............................. 296/146.1; 296/187.12; 296/146.6; 296/202; 292/340
(58) Field of Classification Search ............ 296/146.1, 296/146.6, 146.9, 202, 187.12; 292/92, 340, 292/341.14, 341.18, DIG. 54, DIG. 55, DIG. 65
See application file for complete search history.

(56) References Cited

U.S. PATENT DOCUMENTS

| | | | |
|---|---|---|---|
| 2,937,043 A * | 5/1960 | Griswold, Jr. et al. .......... 292/5 |
| 4,930,836 A | 6/1990 | Grinn | |
| 5,749,611 A * | 5/1998 | Watson et al. ........... 292/336.3 |
| 5,752,737 A * | 5/1998 | Heldt et al. ............... 296/146.6 |
| 5,803,516 A | 9/1998 | Hempel | |
| 6,609,748 B1 * | 8/2003 | Azzouz et al. ........... 296/146.1 |
| 6,659,537 B1 * | 12/2003 | Moriyama et al. ....... 296/146.6 |
| 6,694,676 B1 * | 2/2004 | Sakamoto et al. ............ 49/366 |
| 6,752,440 B1 * | 6/2004 | Spurr ...................... 292/336.3 |

FOREIGN PATENT DOCUMENTS

| | | |
|---|---|---|
| JP | HEI 2-8813 | 3/1990 |
| JP | 07-208007 | 8/1995 |
| JP | 10-024737 | 1/1998 |
| JP | 3096552 B2 | 8/2000 |
| JP | 2001-173296 A | 6/2001 |
| JP | 2002-147090 A | 5/2002 |
| JP | 3364566 B2 | 10/2002 |
| JP | 2003-25848 A | 1/2003 |

* cited by examiner

*Primary Examiner*—D. Glenn Dayoan
*Assistant Examiner*—Greg Blankenship
(74) *Attorney, Agent, or Firm*—Sughrue Mion, PLLC

(57) ABSTRACT

A door system includes a front door and a rear door that are configured to shut together a continuous opening in a vehicle body; a striker configured to be inserted in both the front door and the rear door so as to couple the front door and the rear door when the continuous opening is shut by the front door and the rear door. When at least one of the front door and the rear door is opened, the striker is drawn out from one of the front door and the rear door so as to cancel the coupling between the front door and the rear door.

11 Claims, 10 Drawing Sheets

DOOR SYSTEM

BACKGROUND OF THE INVENTION

1) Field of the Invention

The present invention relates to a door system, and more particularly to a door system with a front door and a rear door for shutting a continuous opening of a vehicle body.

2) Description of the Related Art

A conventional door system disclosed in the Japanese Patent Application Laid-Open No. 2003-25848 for example includes a front door and a rear door for shutting an opening continuous in a back-and-forth direction of a vehicle and for holding the doors closed.

In the door system, the rear door is allowed to open only when the front door is open and the front door is allowed to close only when the rear door is closed.

However, it can be bothersome if the rear door is allowed to open only when the front door is open, because a passenger is required to open the front door every time the passenger gets on/off a rear seat.

The front door and the rear door may be designed to open and close independently of each other to solve this problem, but the front door and the rear door may deform greatly at their joint if the vehicle is crashed from a side of the doors, that is, from a side parallel to the back-and-forth direction of the vehicle.

SUMMARY OF THE INVENTION

It is an object of the present invention to solve at least the problems in the conventional technology.

A door system according to an aspect of the present invention includes a front door and a rear door that are configured to shut together a continuous opening in a vehicle body; a striker configured to be inserted in both the front door and the rear door so as to couple the front door and the rear door when the continuous opening is shut by the front door and the rear door, wherein when at least one of the front door and the rear door is opened, the striker is drawn out from one of the front door and the rear door so as to cancel the coupling between the front door and the rear door.

A door system according to another aspect of the present invention is for opening and shutting a continuous opening of a vehicle. The door system includes a front door having a first surface, and configured to open and shut a front portion of the continuous opening; a rear door having a second surface corresponding to the first surface, and configured to open and shut a rear portion of the continuous opening independently of the front door, the rear portion complementing the continuous opening with the front portion; and a striker provided at one of the front door and the rear door, and configured to be inserted in the other one of the front door and the rear door when the continuous opening is completely closed as the front and rear portions are shut by the front and rear doors respectively, wherein the first surface and the second surface approach and oppose each other so as to be substantially parallel to each other, when the continuous opening is completely closed.

The other objects, features, and advantages of the present invention are specifically set forth in or will become apparent from the following detailed descriptions of the invention when read in conjunction with the accompanying drawings.

DETAILED DESCRIPTION

Exemplary embodiments of a door system according to the present invention are explained in detail below with reference to the accompanying drawings. In these embodiments, the terms "front" and "rear" refer to front and rear of the vehicle relative to a back-and-forth direction along which the vehicle travels, and the terms "upper" and "lower" are relative to a vertical height of the vehicle.

Figure 1:
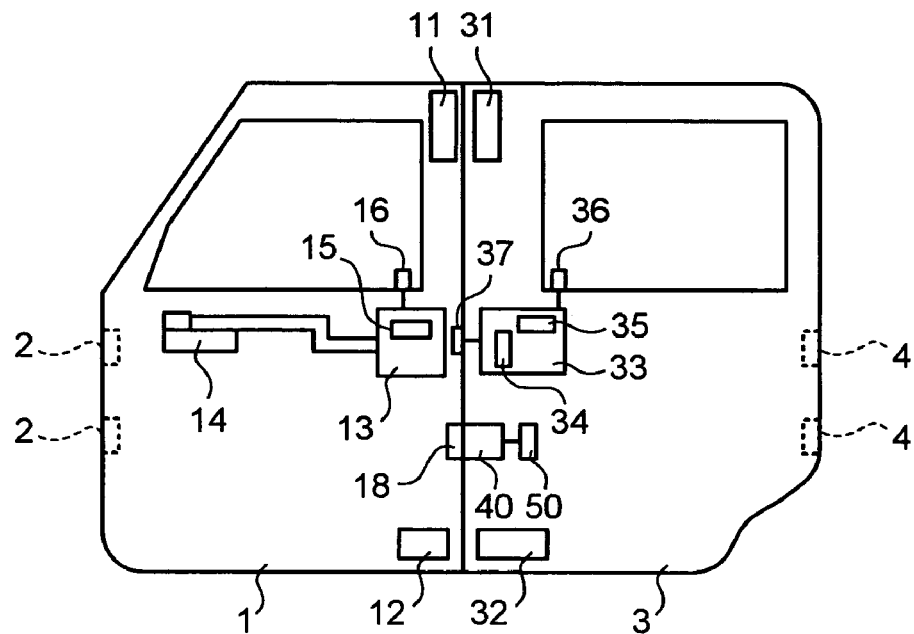
FIG. 1 is an illustration of a door system according to an embodiment of the present invention.
Figure 2:
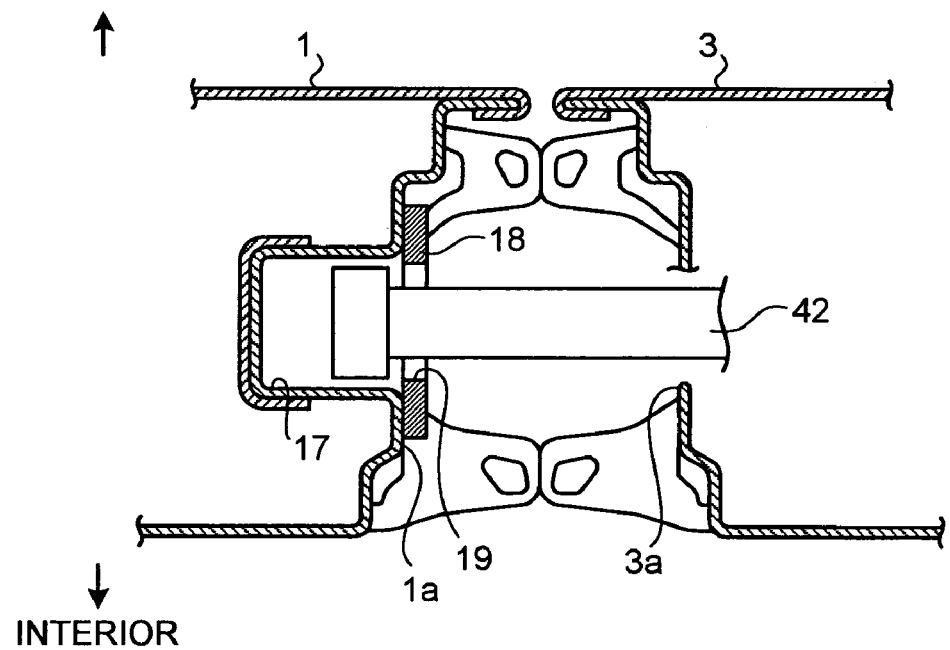
FIG. 2 is an illustration of a cross section of a joint between a front door and a rear door in the door system illustrated in FIG. 1.
Figure 3:
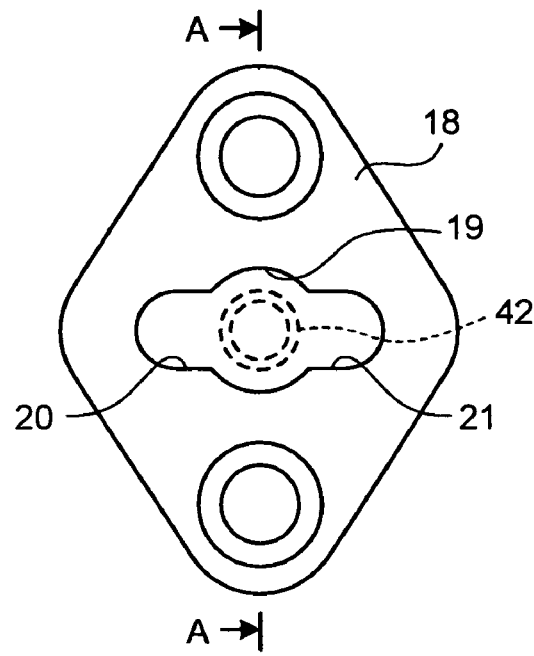
FIG. 3 is a front view of a catcher attached to a rear end of the front door.
Figure 4:
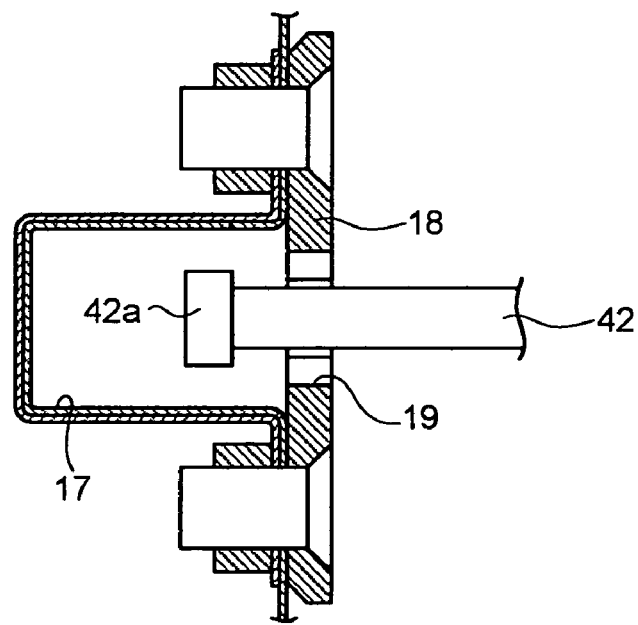
FIG. 4 is an illustration of a cross section along a line A—A of the catcher illustrated in FIG. 3.
Figure 5:
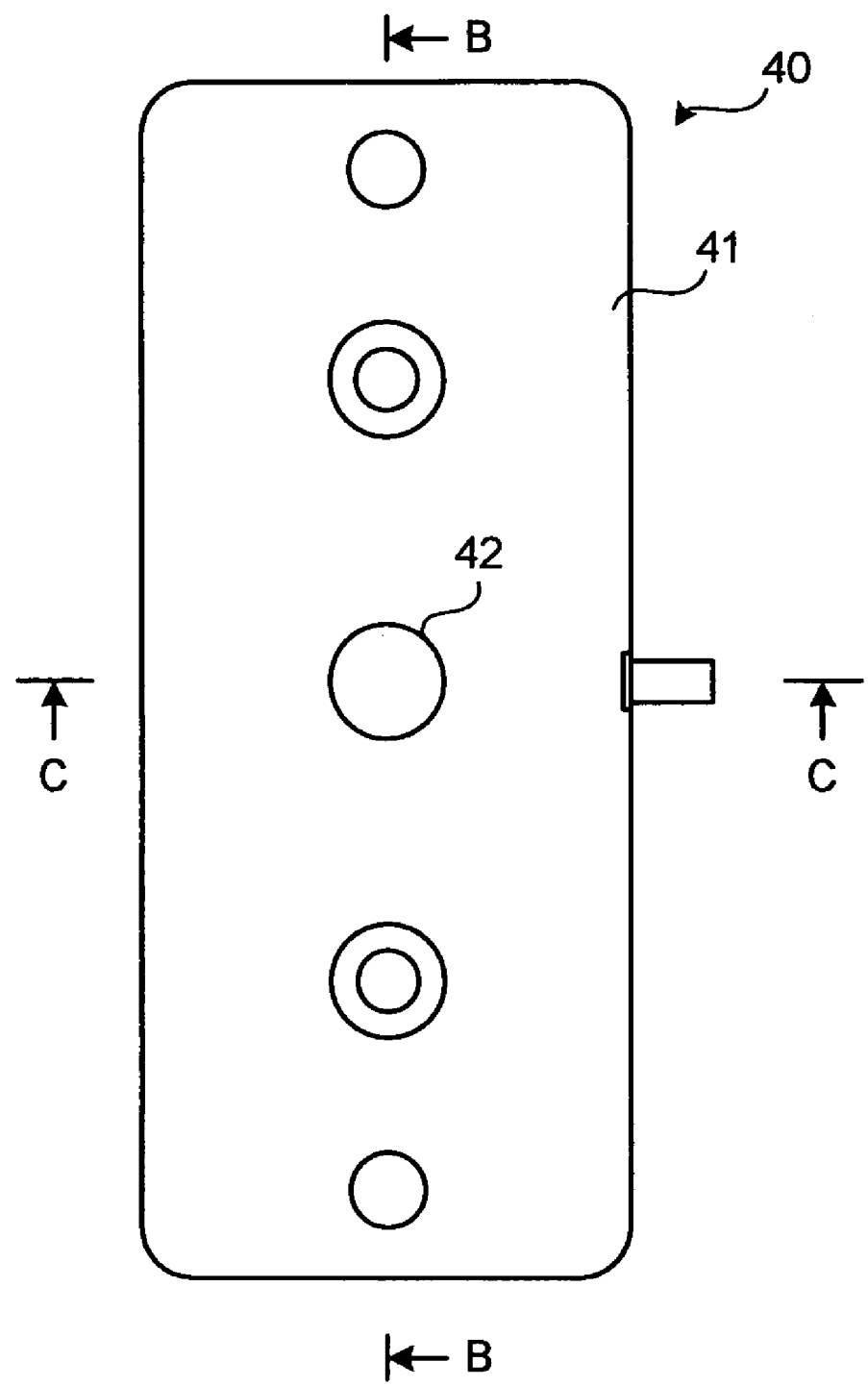
FIG. 5 is a front view of a striker mechanism attached inside the rear door.
Figure 6:
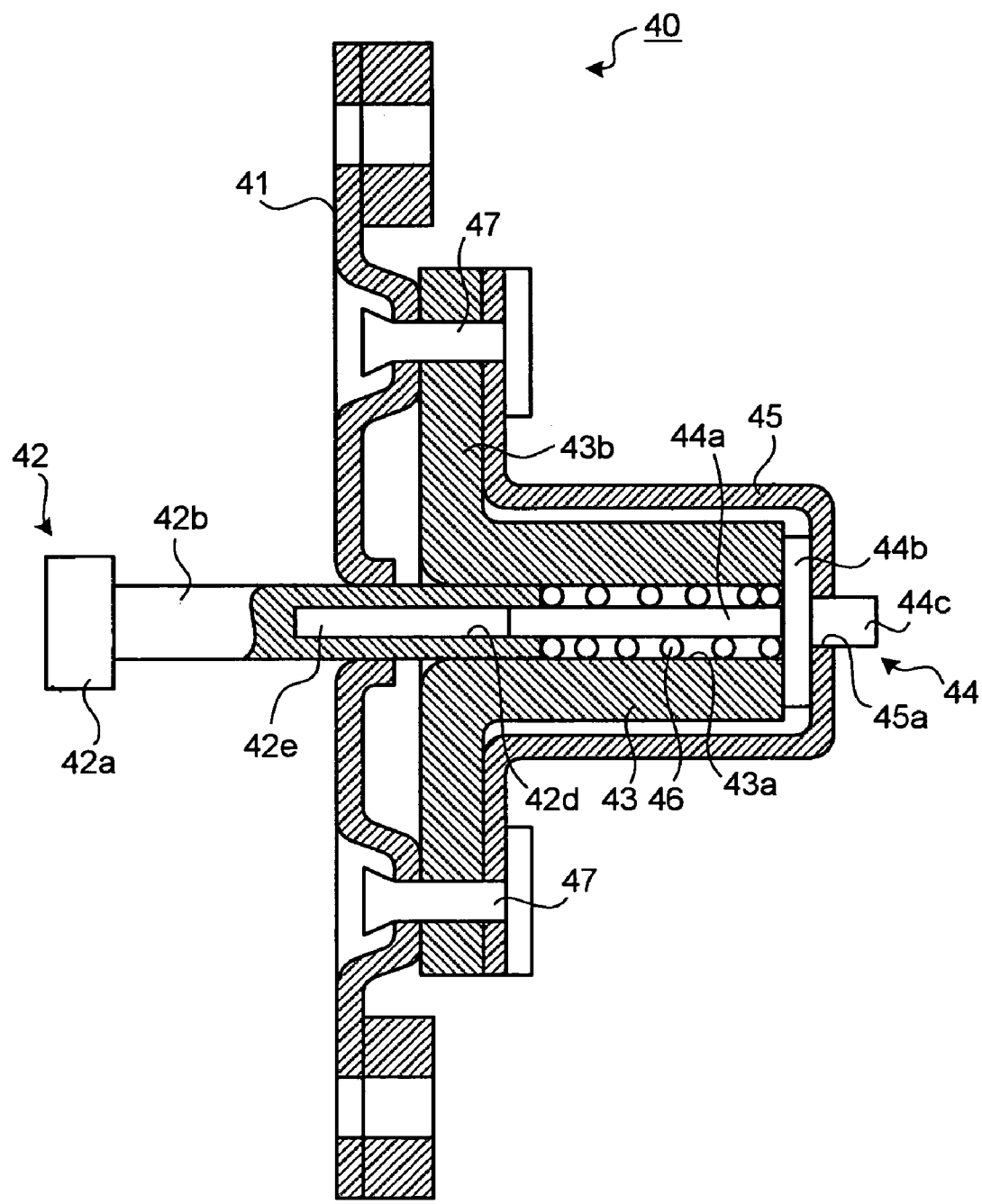
FIG. 6 is an illustration of a cross section along a line B—B of the striker mechanism illustrated in FIG. 5.
Figure 7:
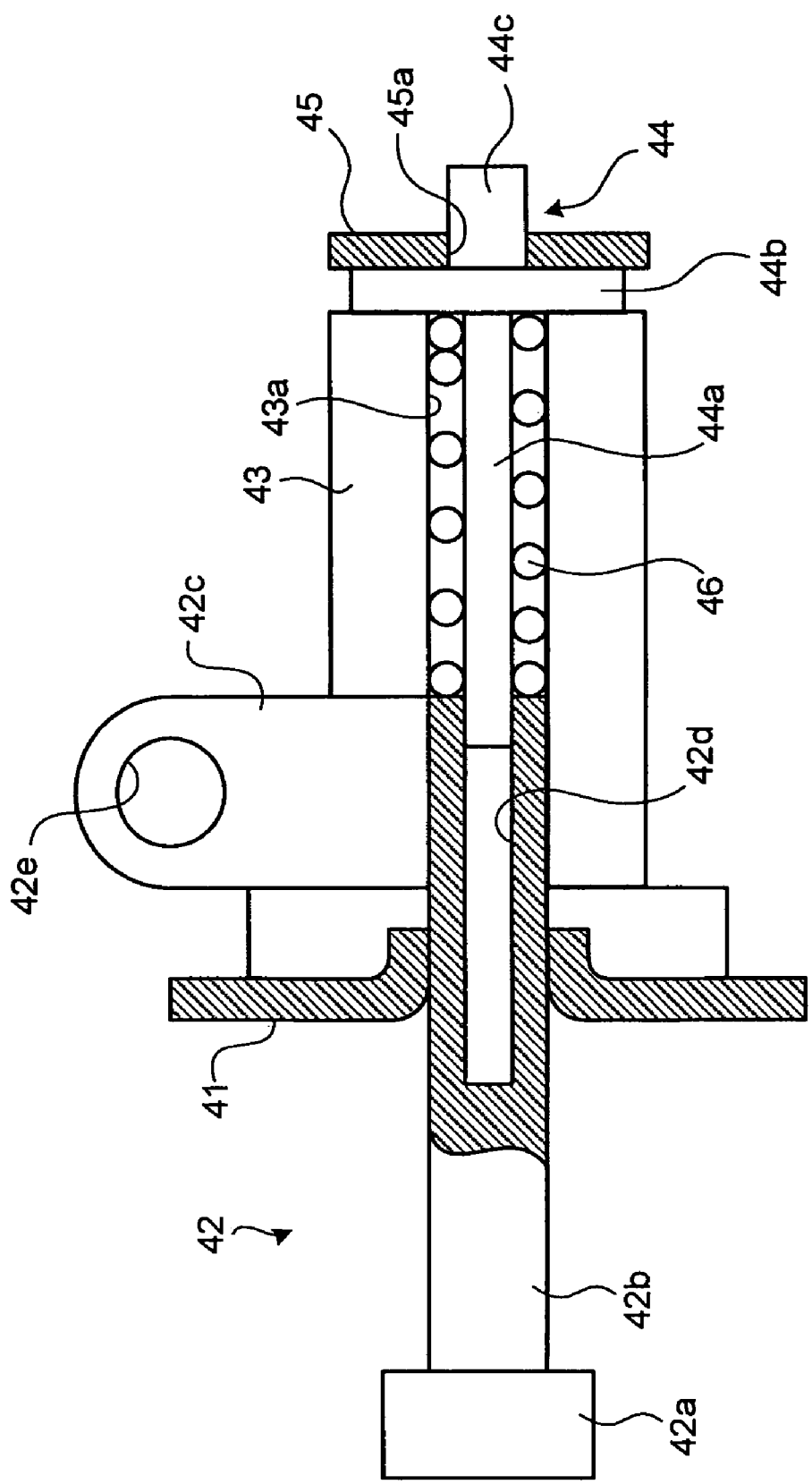
FIG. 7 is an illustration of a cross section along a line C—C of the striker mechanism illustrated in FIG. 5.

FIG. 1 is an illustration of a door system according an embodiment of the present invention. FIG. 2 is a cross-sectional view of a joint between a front a door and a rear door in the door system illustrated in FIG. 1. FIG. 3 is a front view of a catcher attached to a rear end of the front door. FIG. 4 is an A—A cross-sectional view of the catcher illustrated in FIG. 3. FIG. 5 is a front view of a striker mechanism attached inside the rear door. FIG. 6 is a B—B cross-sectional view of the striker mechanism illustrated in FIG. 5. FIG. 7 is a C—C cross-sectional view of the striker mechanism illustrated in FIG. 5.

The door system according to the embodiment is utilized in a so-called "center-pillar-less" motor vehicle that has an opening continuous in the back-and-forth direction. As illustrated in FIG. 1, a front door 1 is supported on a front end of the opening by front hinges 2, and a rear door 3 is supported on a rear end of the opening by rear hinges 4. The front door 1 has a rear end surface 1a crossing from an interior to an exterior of the vehicle. The rear door 3 has a front end surface 3a crossing from the interior to the exterior and substantially in parallel with the rear end surface 1a of the front door 1.

The front door 1 has an upper latch mechanism 11 at an upper rear position of the front door 1 and a lower latch mechanism 12 at a lower rear position of the front door 1. These latch mechanisms may be any known latch mechanisms, which hold the front door 1 closed and outputs a closed-state signal to a front remote control 13 when an operation for closing the front door 1 is executed. In addition, the latch mechanisms is configured to release the front door 1 from being held closed so as to allow the front door 1 to open, based on an instruction from the front remote control 13.

The front door 1 has an inside handle 14 located inside the vehicle and an outer handle 15 outside the vehicle. The inside handle 14 and the outer handle 15 are connected to the front remote control 13. The front remote control 13 instructs the upper latch mechanism 11 and the lower latch mechanism 12 to release the front door 1 from being held closed when the inside handle 14 or the outer handle 15 is operated.

The front door 1 further has a lock/unlock knob 16 connected to the front remote control 13 and located inside the vehicle. When the lock/unlock knob 16 is located, the front remote control 13 invalidates operations of the inside handle 14 and the outer handle 15. Further, when the lock/unlock knob 16 is located, even if the inside handle 14 or the outer handle 15 is operated, the upper latch mechanism 11 and the lower latch mechanism 12 keep holding the front door 1 closed. If the lock/unlock knob 16 is unlocked, the front remote control 13 instructs the upper latch mechanism 11 and the lower latch mechanism 12 to release the front door 1 from being held closed in response to the operation through the inside handle 14 or the outer handle 15.

The front door 1 has a recess 17 on the rear end surface 1a of the front door 1 as illustrated in FIGS. 2 to 4. The recess 17 is configured to receive a striker 42 described later. A catcher 18 is attached to the rear end so as to cover the recess 17. The catcher 18 has a hole 19 slightly larger than an outer shape of the striker 42 so as to receive the striker 42. The hole 19 has an engagement portion 20 projected toward the interior and an engagement portion 21 projected toward the exterior.

As illustrated in FIG. 1, the rear door 3 has an upper latch mechanism 31 at an upper front position of the rear door 3 and a lower latch mechanism 32 at a lower front position of the rear door 3. These latch mechanisms also may be the known latch mechanisms similar to the upper latch mechanism 11 and the lower latch mechanism 12 of the front door 1. The upper latch mechanism 31 and the lower latch mechanism 32 hold the rear door 3 closed and output closed-state signals to a rear remote control 33 when an operation for closing the rear door 3 is executed. In addition, the latch mechanisms 31 and 32 are configured to release the rear door 3 from being held closed so as to allow the rear door 3 to open and close based on an instruction from the rear remote control 33.

The rear door 3 further has an inside handle 34 inside the vehicle and an outer handle 35 outside the vehicle. The inside handle 34 and the outer handle 35 are connected to the rear remote control 33. The rear remote control 33 instructs the upper latch mechanism 31 and the lower latch mechanism 32 to release the rear door 3 from being held closed, when the inside handle 34 or the outer handle 35 is operated.

The rear door 3 includes a lock/unlock knob 36 connected to the rear remote control 33 and located inside the vehicle. When the lock/unlock knob 36 is locked, the rear remote control 33 invalidates the operations of the inside handle 34 and the outer handle 35. Further, when the lock/unlock knob 36 is locked, even if the inside handle 34 or the outer handle 35 is operated, the upper latch mechanism 31 and the lower latch mechanism 32 hold the rear door 3 closed. When the lock/unlock knob 36 is unlocked, the rear remote control 33 instructs the upper latch mechanism 31 and the lower latch mechanism 32 to release the rear door 3 from being held closed, in response to the operation through the inside handle 34 or the outer handle 35.

The rear door 3 has a child lever 37 at an approximate center of the front end of the rear door 3. The child lever 37 can be locked or unlocked when the front door 1 is open and the child lever 37 is exposed. The child lever 37 is also connected to the rear remote control 33. If the child lever 37 is in locked, the rear remote control 33 invalidates the operation of the inside handle 34, and even if the inside handle 34 is operated, the upper latch mechanism 31 and the lower latch mechanism 32 hold the rear door 3 closed. When the outer handle 35 is operated, the rear remote control 33 instructs the upper latch mechanism 31 and the lower latch mechanism 32 to stop holding the rear door 3 closed.

The rear door 3 also has a striker mechanism 40 inside the vehicle. The striker mechanism 40 includes a base plate 41, a striker 42, a housing 42, a guide pin 44, and a cover plate 45, as illustrated in FIGS. 5 to 7.

The base plate 41 is configured to attach the striker mechanism 40 to a rear side of the front end surface 3a of the rear door 3 and may be rectangular in shape as illustrated in FIG. 5.

The striker 42 is configured to be inserted in the catcher 18 so as to couple the front door 1 with the rear door 3, and, as illustrated in FIGS. 6 and 7, includes a head 42a, a slider portion 42b, a connector portion 42c and a bore 42d. The head 42a is inserted into the catcher 18 through the hole 19 and has a cylindrical shape with a diameter slightly larger than that of the slider portion 42b. The slider portion 42b is configured to be inserted in the housing 43 and to slide in the back-and-forth direction and has a cylindrical shape. The connector portion 42c extends outward in a radial direction relative to an axis of the striker 42 from the slider portion 42b. The connector portion 42c has a hole 42e configured to be connected to an actuator coupler described later. The bore 42d is formed from a rear end of the striker 42 and configured such that the guide pin 44 can be inserted in the bore 42d.

The housing 43 supports the striker 42 slidably in the back-and-forth direction of the vehicle. The housing 43 includes a striker slide 43a and a flange 43b. The striker slide 43a supports the slider portion 42b of the striker 42 and has a partly notched cylindrical shape. The slider portion 42b of the striker 42 is inserted in a cylindrical portion of the striker slide 43a such that the connector portion 42c of the striker 42 is located in a notched portion of the striker slide 43a.

The guide pin 44 supports a rear portion of the striker 42 slidably and includes a guide 44a, a flange 44b, and a positioning portion 44c. The guide 44a is inserted into the bore 42d in the striker 42 and configured to support the striker 42 slidably. The flange 44b is configured to abut on the cover plate 45. The positioning portion 44c is inserted into a pin hole 45a formed through the cover plate 45 so as to fix the guide pin 44 in a predetermined position.

A coil spring 46 is placed between the rear end of the striker 42 and the flange 44b of the guide pin 44 and configured to apply a force on the striker 42 toward the front of the vehicle.

The cover plate 45 is configured to attach the housing 43 and the guide pin 44 to the base plate 41. The base plate 41, the housing 43, and the cover plate 45 are assembled in a sandwiched configuration, and a pin 47 penetrating through the sandwiched configuration is then pressed or squashed so as to fix the base plate 41, the housing 43, and the cover plate 45 together as an integral construction.

The actuator coupler (not shown) is connected to the hole 42e formed through the connector portion 42c of the striker 42 and to a striker actuator 50 inside the rear door 3. When power is supplied to the striker actuator 50, the connector portion 42c of the striker 42 is pulled toward the rear of the vehicle via the actuator coupler. When the power supplied to the striker actuator 50 is cut off, the connector portion 42c of the striker 42 is released toward the front of the vehicle. The actuator coupler may include a rod, a link, a wire, or the like.

Operations of the door system according to the embodiment is explained next. When the lock/unlock knobs 16 and 36 are unlocked and any one of the inside handles 14 and 34 and the outer handles 15 and 35 of the doors 1 and 3 is operated, power is supplied to the striker actuator 50 first. The striker 42 in the rear door 3 is then pulled toward the rear of the vehicle. As a result, the striker 42 is extracted from the catcher 18 in the front door 1 to release the front door 1 and the rear door 3 from being coupled to each other. Subsequently, the remote control 13 or 33 on the door 1 or 3 operated instructs the upper latch mechanism 11 or 31 and the lower latch mechanism 12 or 32 to open the door 1 or 3 respectively. The upper latch mechanism 11 or 31 and the lower latch mechanism 12 or 32 release the door 1 or 3 from being held closed and allow the door 1 or 3 to open.

When both the front door 1 and the rear door 3 are closed, the closed-state signals are output by the upper latch mechanism 11 and the lower latch mechanism 12 of the front door 1 as well as the upper latch mechanism 31 and the lower latch mechanism 32 on the rear door 3, and received by the front remote control 13 and the rear remote control 33, respectively. When both the front remote control 13 and the rear remote control 33 receive the closed-state signals, it is determined that both the front door 1 and the rear 3 are closed. Consequently, the power supplied to the striker actuator 50 is cut off, and the coil spring 46 applies a force to the striker 42 so as to insert the striker 42 in the catcher 18 and couple the front door 1 with the rear door 3.

According to this door system, the front door 1 and the rear door 3 can be independently opened and closed. When both the front door 1 and the rear door 3 are closed, the striker 42 in the rear door 3 is inserted in the catcher 18 in the front door 1. Therefore, if the vehicle is crashed from the side of the doors, the front door 1 and the rear door 3 are configured to deform such that the head 42a of the striker 42 is displaced from the hole 19 of the catcher to either of the engagement portions 20 and 21 on both sides of the hole 19. The front door 1 thus remains firmly coupled to the rear door 3. As a result, large deformation of the joint between the front door 1 and the rear door 3 can be prevented.

It is preferable that an audible alarm is generated when at least one of the front door 1 and the rear door 3 is open so as to give a warning to the passenger. Accordingly, even if the power supplied to the striker actuator 50 is cut off for some reason and the striker 42 protrudes from the front end of the rear door 3, it is possible to protect the front door 1 from being damaged by any interferences between the front door 1 and the striker 42.

In the door system, the catcher 18 is located at the rear end of the front door 1 and the striker mechanism 40 at the rear side of the front end of the rear door 3. Alternatively, the catcher 18 may be located at the front end of the rear door 3 and the striker mechanism 40 at the front side of the rear end of the front door 1.

Figure 8:
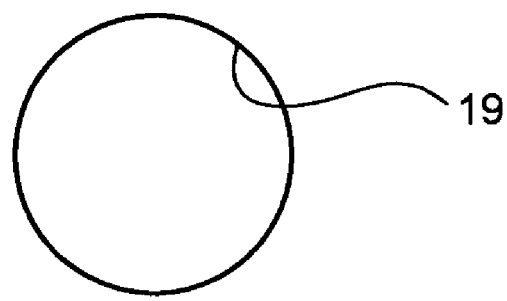
FIG. 8 is a side view of a hole of a catcher according to another example.

Further, according to the embodiment, the hole 19 of the catcher 18 includes the engagement portion 20 projected toward the interior of the vehicle and the engagement portion 21 projected toward the exterior of the vehicle, but only the hole 19 may be provided as illustrated in FIG. 8 instead.

Figure 9:
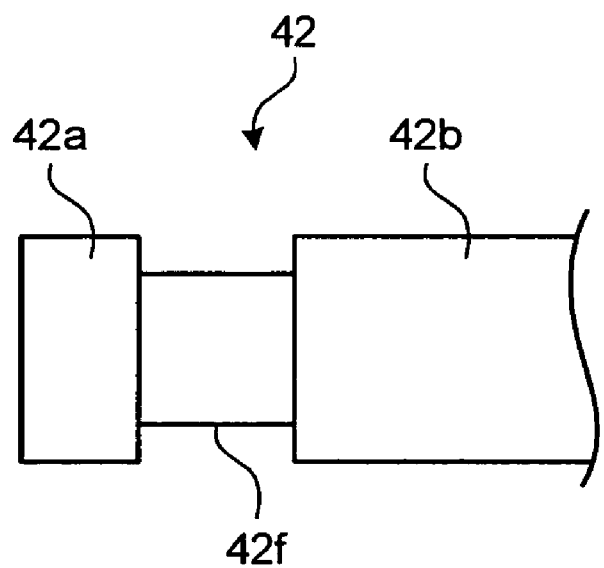
FIG. 9 is a plane view of a head of a striker according to still another example.

Furthermore, although the diameter of the head 42a of the striker 42 is configured to be slightly larger than that of the slider portion 42b, instead, an engagement neck 42f may be formed between the head 42a and the slider portion 42b of the striker 42 as illustrated in FIG. 9.

Moreover, although the front door 1 and the rear door 3 include the upper latch mechanisms 11 and 31 as well as the lower latch mechanisms 12 and 32 both having the release function, alternatively, the front door 1 and the rear door 3 may include an upper latch mechanism and a lower latch mechanism both not having the release function. If the upper and lower latch mechanisms not having the release function are used, an upper latch mechanism coupler and a lower latch mechanism coupler may be provided inside the door so as to release the upper and lower latch mechanisms from being held closed through the operations of the inside handle 14 or 34, or the outer handle 15 or 35.

Figure 10:
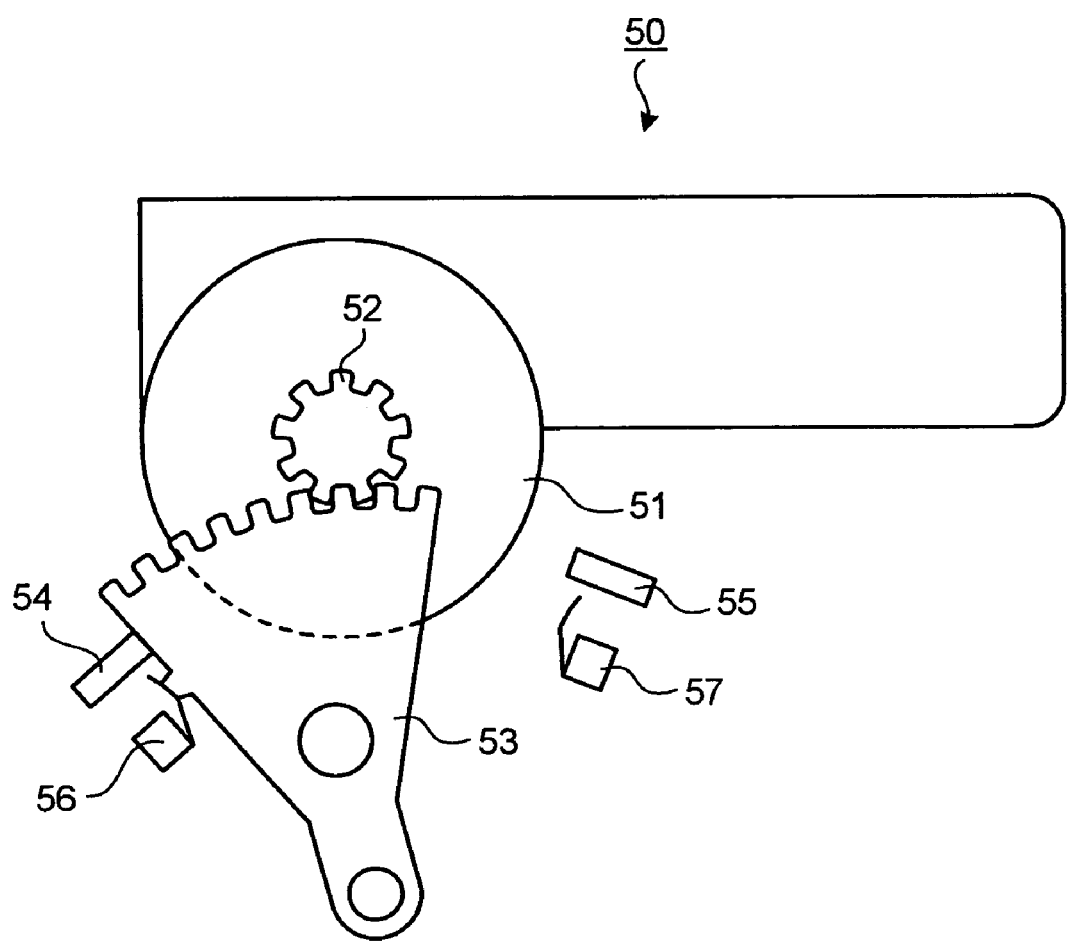
FIG. 10 is an illustration of a structure of a striker actuator.

As illustrated in FIG. 10, the striker actuator 50 may include a motor 51, a pinion gear 52 attached to an axis of the motor 51, and a sector gear 53 to be engaged with the pinion gear 52. The motor 51 is rotated forward or backward to push or pull the striker 42 via an actuator coupler (not shown) connected to the sector gear 53. The coil spring is preferably not mounted between the striker 42 and the guide pin 44 in this example.

The striker actuator 50 further includes a pull stopper 54, a push stopper 55, a pull switch 56, and a push switch 57. The pull stopper 54 and the push stopper 55 are configured to restrict a swing width of the sector gear 53. The pull stopper 54 is configured to abut on the sector gear 53 when the actuator coupler (not shown) has completely pulled the striker 42. The push stopper 55 is configured to abut on the sector gear 53 when the actuator coupler has completely pushed the striker 42. The pull switch 56 is configured to detect the abutment of the sector gear 53 against the pull stopper 54. The push switch 57 is configured to detect the abutment of the sector gear 53 against the push stopper 55.

When the front door 1 and the rear door 3 are closed and the inside handle 14 or 34, or the outer handle 15 or 35 on the door 1 or 3 is operated, the motor 51 rotates until the pull switch 56 detects the sector gear 53. The actuator coupler (not shown) then pulls the striker 42 provided at the rear door 3 toward the rear of the vehicle such that the striker 42 is extracted from the catcher 18 of the front door 1.

When both the front door 1 and the rear door 3 are closed, the motor 51 rotates until the push switch 57 detects the sector gear 53. The actuator coupler then pushes the striker 42 toward the front of the vehicle such that the striker 42 is inserted in the catcher 18.

According to the striker actuator, even if the power to the motor 51 of the striker actuator 50 is cut off by some reason while the door 1 or 3 is open, the striker 42 is prevented from being pushed out of the front end of the rear door 3. Therefore, even if the door 1 or 3 is then erroneously closed, the door 1 or 3 does not interfere with the striker 42, and thus the doors 1 and 3 can be prevented from being damaged.

Figure 11:
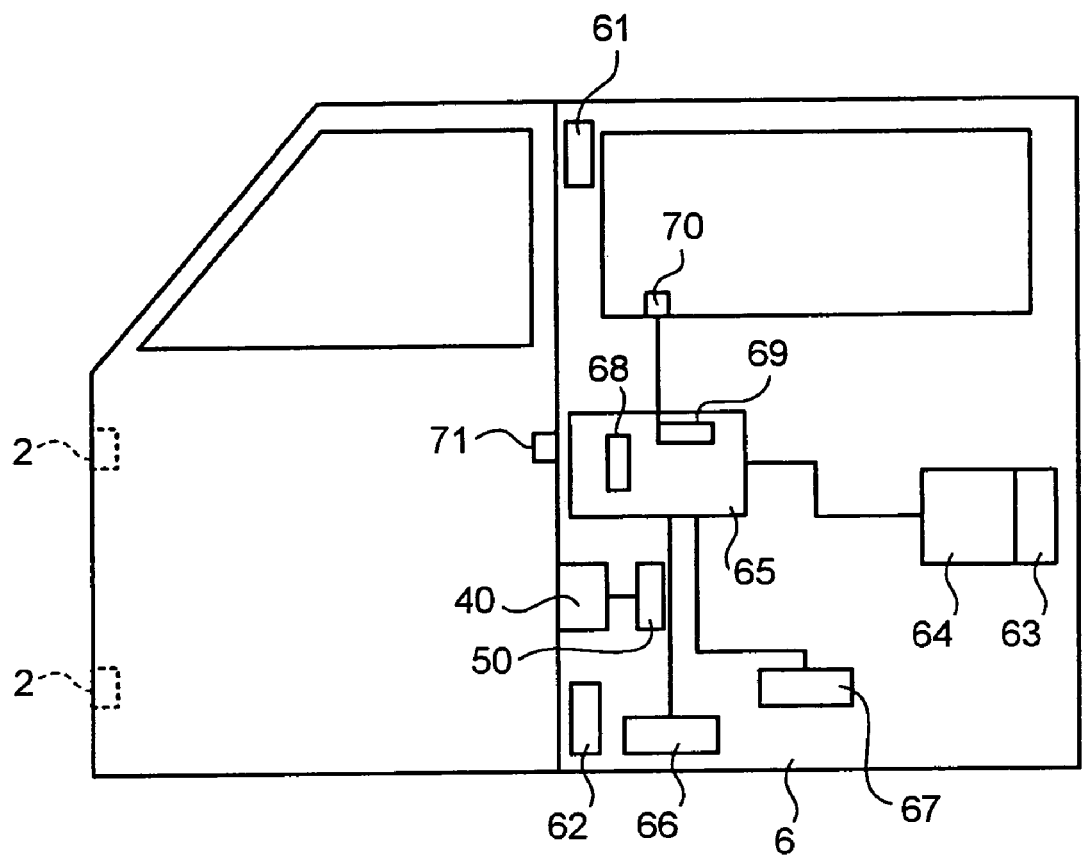
FIG. 11 is an illustration of a door system according to another embodiment of the present invention.
Figure 12:
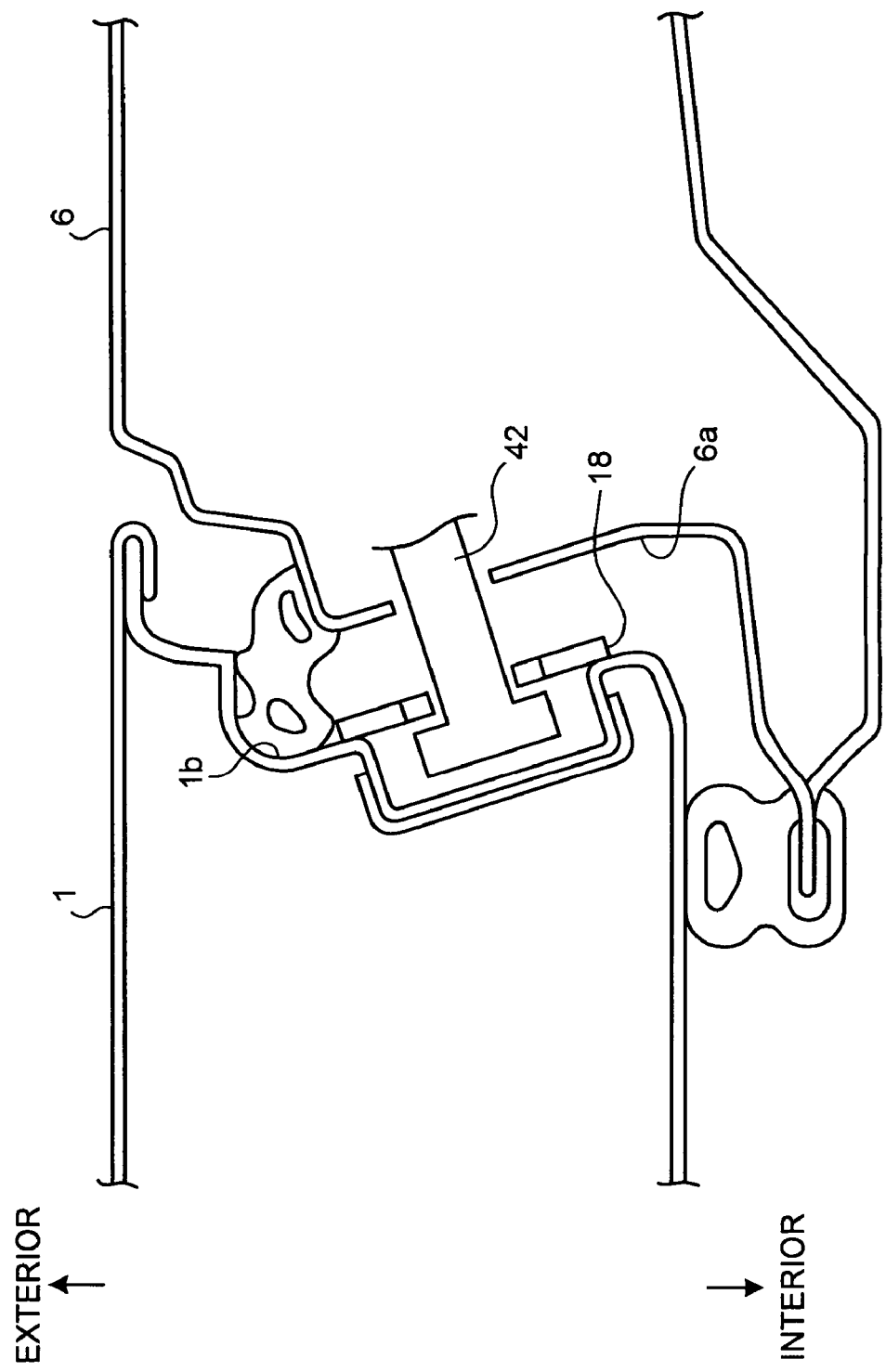
FIG. 12 is an illustration of a cross section of a joint between a front door and a rear door illustrated in FIG. 11.
Figure 13:
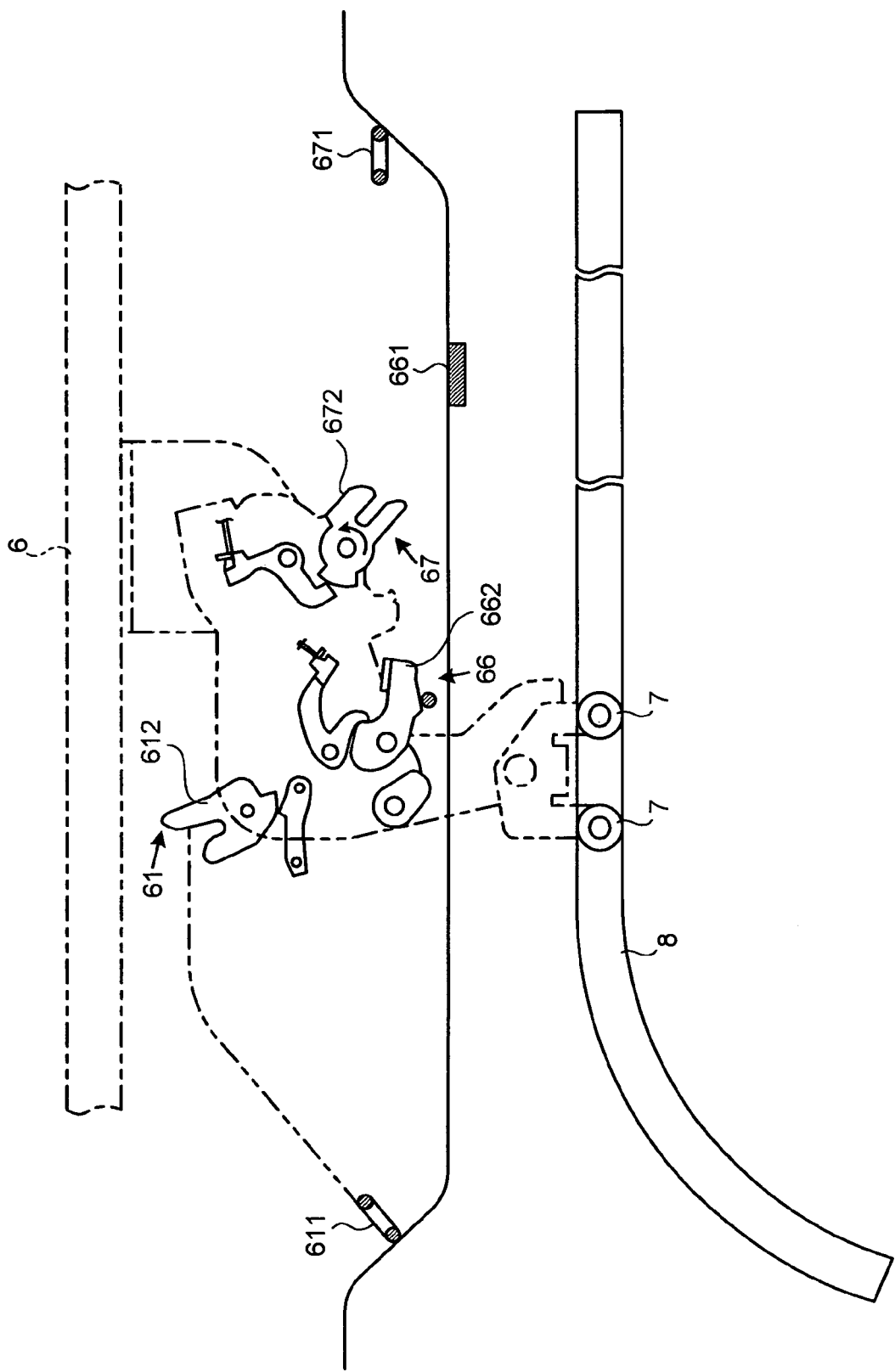
FIG. 13 is an illustration of an internal structure of the rear door illustrated in FIG. 11.

A structure of a door system according to another embodiment is explained next. FIG. 11 is an illustration of the door system. FIG. 12 is a cross-sectional view of a joint between a front door and a rear door illustrated in FIG. 11. FIG. 13 is an illustration of an internal structure of the rear door illustrated in FIG. 11.

The door system according to this embodiment is utilized in so-called "center-pillar-less" motor vehicles, similarly to the door system according to the previous embodiment. The door system according to this embodiment includes a front door 1 having front hinges 2 and a rear door 6 configured to slide in a back-and-forth direction of a vehicle. The front door 1 and the rear door 6 are configured to shut an opening continuous in the back-and-forth direction.

The front door 1 has a rear end surface 1b crossing from an interior to an exterior of the vehicle so as to slightly tilt toward the front of the vehicle. Otherwise, the front door 1 is not different from that of the door system according to the previous embodiment. Therefore, description of the front door 1 for this embodiment is omitted.

Rollers 7 for supporting the rear door 6 are provided at upper and lower portions of the rear door 6. The rollers 7 roll over rails 8 attached to the upper and lower portions of the opening formed in a body of the vehicle so as to allow the rear door 6 to open and close in the back-and-forth direction.

The rear door 6 has a front end surface 6a crossing from the exterior to the interior. The front end surface 6a overlaps, or is substantially parallel with, the rear end surface 1b of the front door 1, when the rear door 6 and the front door 1 are shut.

The rear door 6 has an upper latch mechanism 61 at an upper front position of the rear door 6 and a lower latch mechanism 62 at a lower front position of the rear door 6. The upper latch mechanism 61 and the lower latch mechanism 62 each includes a striker 611 attached to a body of the vehicle and a latch mechanism 612 attached to the rear door 6 both configured to close the rear door 6 at a front portion of the rear door 6.

A rear latch mechanism 63 is arranged at an approximate center of a rear portion of the rear door 6. The rear latch mechanism 63 includes a striker (not shown) attached to the vehicle body and a latch mechanism (not shown) attached to the rear portion of the rear door 6. The striker engages with the latch mechanism so as to close the rear door 6.

The rear door 6 further includes a closer 64 configured to pull the rear door 6 toward the body of the vehicle so as to close the rear door 6 completely when the rear door 6 open is shifted to a half-open state, or closed incompletely.

The upper latch mechanism 61, the lower latch mechanism 62, and the rear latch mechanism 63 hold the rear door 6 closed when an operation for closing the rear door 6 is carried out, and output closed-state signals to a later-described rear remote control 65. These mechanisms are also configured to release the rear door 6 from being held closed so as to allow the rear door 6 to close and open based on an instruction from the rear remote control 65.

The rear door 6 has a half-open retainer 66 and a full-open retainer 67 below a center of the rear door 6. The half-open retainer 66 includes an intermediate striker 661 attached to the body and a latch mechanism 662 attached to the rear door 6. The half-open retainer 66 restricts the rear door 6 to stay half-open as the latch mechanism 662 abuts on the intermediate striker 661, when for example a windowpane is opened to an extent over a predetermined extent. The full-open retainer 67 includes a full-open striker 671 attached to the body and a latch mechanism 672 attached to the rear door 6, which are configured to hold the rear door 6 fully open.

An inside handle 68 is located on an interior side of the rear door 6 and an outer handle 69 on an exterior side of the rear door 6. The inside handle 68 and the outer handle 69 are connected to the rear remote control 65. The rear remote control 65 is configured to instruct the upper latch mechanism 61, the lower latch mechanism 62, and the rear latch mechanism 63 to release the rear door 6 from being held closed when the inside handle 68 or the outer handle 69 is operated.

A lock/unlock knob 70 is connected to the rear remote control 65 and located on the interior side of the rear door 6. If the lock/unlock knob 70 is locked, the rear remote control 65 invalidates the operations of the inside handle 68 and the outer handle 69. Consequently, even if the inside handle 68 or the outer handle 69 is operated, the upper latch mechanism 61, the lower latch mechanism 62, and the rear latch mechanism 63 hold the rear door 6 closed. If the lock/unlock knob 70 is unlocked, the rear remote control 65 instructs the upper latch mechanism 61, the lower latch mechanism 62, and the rear latch mechanism 63 to release the rear door 6 from being held closed in response to the operation through the inside handle 68 or the outer handle 69.

The rear door 6 also has a child lever 71 at an approximate center of the front end surface of the rear door 6. The child lever 71 can be locked or unlocked when it is exposed as the front door 1 is opened. The child lever 71 is also connected to the rear remote control 65. If the child lever 71 is locked, the rear remote control 65 invalidates the operation of the inside handle 68. Consequently, even if the inside handle 68 is operated, the upper latch mechanism 61, the lower latch mechanism 62, and the rear latch mechanism 63 hold the rear door 6 closed. When the outer handle 65 is operated, the rear remote control 65 instructs the upper latch mechanism 61, the lower latch mechanism 62, and the rear latch mechanism 63 to release the rear door 6 from being held closed.

The rear door 6 also includes a striker mechanism 40 located therein. This striker mechanism is not different from the striker mechanism 40 in the door system according to the previous embodiment and accordingly description of the striker mechanism is omitted.

Operations of the door system according to this embodiment is explained next. When the lock/unlock knobs 16 and 70 are unlocked and the inside handle 14 or 68, or the outer handle 15 or 69 on the doors 1 or 6 is operated, power is supplied to the striker actuator 50 first. The striker 42 of the rear door 6 is then pulled toward the rear of the vehicle. As a result, the striker 42 is extracted from the catcher 18 of the front door 1 such that the front door 1 and the rear door 6 are released from being coupled to each other. Subsequently, the remote control 13 or 65 on the door 1 or 6 operated instructs the upper latch mechanism 11 or 61 and the lower latch mechanism 12 or 62 to open the door 1 or 6. Accordingly, the upper latch mechanism 11 or 61 and the lower latch mechanism 12 or 62 release the door 1 or 6 from being held closed and allow the door 1 or 6 to open.

When both the front door 1 and the rear door 6 are closed, closed-state signals output from the upper latch mechanism 11 and the lower latch mechanism 12 of the front door 1 are received by the front remote control 13, and closed-state signals output from the upper latch mechanism 61 and the lower latch mechanism 62 of the rear door 6 are received by the rear remote control 65. When the closed-state signals are received by both the front remote control 13 and the rear remote control 65, it is determined that both the front door 1 and the rear door 6 are closed. The power supplied to the striker actuator 50 is then cut off and, the coil spring 46 applies a force to the striker 42 so as to insert the striker 42 in the catcher 18 and to couple the front door 1 with the rear door 6.

In the door system, although the read door 6 is provided with the upper latch mechanism 61 and the lower latch mechanism 62 both having the release function, alternatively, an upper latch mechanism 61 and a lower latch mechanism 62 both having no release function may be provided instead. If the upper latch mechanism and the lower latch mechanism both having no release function are used, an upper latch mechanism coupler and a lower latch mechanism coupler may be arranged inside the rear door 6 which are configured to release the upper latch mechanism and the lower latch mechanism from being held closed in response to the operation of the inside handle 68 or the outer handle 69.

According to the door system of this embodiment, the front door 1 and the rear door 6 can be independently opened and closed even if the rear door 6 is a sliding door. When both the front door 1 and the rear door 6 are closed, the striker 42 of the rear door 6 is inserted in the catcher 18 of the front door 1. Therefore, even when the motor vehicle is crashed from a side of the doors, passengers can be protected because the front door 1 and the rear door 6 are prevented from being deformed greatly at their joint.

As described above, according to the present invention, the front door and the rear door can be independently opened and closed, and when both the front door and the rear door are shut, the striker is inserted between the doors so as to couple the doors. Therefore, even if the motor vehicle is crashed from the side of the doors, the front door and the rear door are prevented from being deformed greatly at their joint.

Further, one of the front door and the rear door is provided with the striker, and the other with the catcher for receiving the striker. Consequently, when the motor vehicle is crashed from the side, the striker is engaged with the catcher so as to couple the front door firmly with the rear door. Accordingly, the front door and the rear door are prevented from being deformed greatly at their joint.

Furthermore, the rear door has the upper latch mechanism at the upper front position and the lower latch mechanism at the lower front position, which are configured to hold the rear door closed. Accordingly, the front door and the rear door can be independently opened and closed.

Moreover, the rear door has, at the front end of the rear door, the child lever configured to invalidate the operation for opening the rear door from the interior of the vehicle. As a result, the child lever can be operated when the front door is open.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A door system comprising:
    a front door and a rear door that are configured to shut together a continuous opening in a vehicle body;
    a striker configured to be inserted in both the front door and the rear door along an axis so as to couple the front door and the rear door when the continuous opening is shut by the front door and the rear door, said striker comprising a slider portion and a head portion, the slider portion being defined by a first cross sectional dimension and the head portion being defined by a second cross sectional dimension, and
    a catcher configured to be formed on one of the front door and the rear door and having a hole sized to receive said head portion and shaped to restrain the head portion from withdrawal from the hole when said striker cannot move along said axis, wherein
    when at least one of the front door and the rear door is opened and the striker is moveable along said axis, the striker is drawn out from one of the front door and the rear door so as to cancel the coupling between the front door and the rear door.

2. The door system according to claim 1, wherein one of the front door and the rear door comprises the striker, and the other one of the front door and the rear door comprises a catcher configured to receive the striker.

3. The door system according to claim 1, wherein the rear door comprises:
    an upper latch mechanism located at an upper front position of the rear door; and
    a lower latch mechanism located at a lower front position, wherein the upper and lower latch mechanisms are configured to hold the rear door closed.

4. The door system according to claim 1, wherein the rear door further comprises a child lever located at a front end surface of the rear door and configured to disable opening of the rear door from an inside of the vehicle.

5. The door system according to claim 1 wherein the striker is moveable.

6. A door system for opening and shutting a continuous opening of a vehicle, the door system comprising:
    a front door
        having a first surface, and
        configured to open and shut a front portion of the continuous opening;
    a rear door
        having a second surface corresponding to the first surface, and
        configured to open and shut a rear portion of the continuous opening independently of the front door, the rear portion complementing the continuous opening with the front portion; and
    a striker provided at one of the front door and the rear door and comprising a slider portion and an head portion, the slider portion being defined by a first cross sectional dimension and the head portion being defined by a second cross sectional dimension larger than the first cross sectional dimension, and configured to be moveable along an axis and inserted in a catcher formed in the other one of the front door and the rear door when the continuous opening is completely closed as the front and rear portions are shut by the front and rear doors respectively,
    wherein the first surface and the second surface approach and oppose each other so as to be substantially parallel to each other, when the continuous opening is completely closed, and
    wherein said catcher is configured to have a hole sized to receive said head portion and shaped to restrain the head portion from withdrawal from the hole when said striker cannot move along said axis.

7. The door system according to claim 6, wherein the rear door comprises a latch mechanism configured to hold the rear door closed.

8. The door system according to claim 6, wherein the second surface of the rear door comprises a child lever configured to disable opening of the rear door from an inside of the vehicle.

9. The door system according to claim 5 wherein the striker is biased in a first direction and is moveable by an actuator in a second direction.

10. The door system according to claim 6 wherein the striker is moveable.

11. The door system according to claim 5 wherein the striker is biased in a first direction and is moveable by an actuator in a second direction.

* * * * *